United States Patent
Schreckinger (10) Patent No.: US 10,861,494 B1
(45) Date of Patent: Dec. 8, 2020

(54) FOOT-ACTUATED MUSICAL TURNTABLE SYSTEM FOR GENERATING SOUNDS

(71) Applicant: Jon Schreckinger, Farmingdale, NY (US)

(72) Inventor: Jon Schreckinger, Farmingdale, NY (US)

( * ) Notice: Subject to any disclaimer, the term of this patent is extended or adjusted under 35 U.S.C. 154(b) by 0 days.

(21) Appl. No.: 16/788,642

(22) Filed: Feb. 12, 2020

(51) Int. Cl.
  *G11B 19/08* (2006.01)
  *G11B 19/18* (2006.01)

(52) U.S. Cl.
  CPC ............. *G11B 19/08* (2013.01); *G11B 19/18* (2013.01)

(58) Field of Classification Search
  None
  See application file for complete search history.

(56) References Cited

U.S. PATENT DOCUMENTS

| | | | | |
|---|---|---|---|---|
| 1,331,828 A | * | 2/1920 | Imboden | G11B 17/00 74/141 |
| 1,426,693 A | * | 8/1922 | Weaser | G11B 17/00 185/39 |
| 2,240,320 A | * | 4/1941 | Thompson | G11B 19/20 369/266 |
| 2,270,789 A | * | 1/1942 | Smith | H03G 3/00 330/131 |
| 2,278,680 A | * | 4/1942 | Thompson | G11B 19/20 369/239 |
| 2,489,045 A | * | 11/1949 | Nakken | G11B 3/08 369/29.02 |
| 2,559,354 A | * | 7/1951 | Gauthier | H04B 1/20 369/11 |
| 5,350,882 A | | 9/1994 | Koguchi et al. | |
| 5,820,061 A | | 10/1998 | Stewart | |
| 6,541,690 B1 | | 4/2003 | Segers, Jr. | |
| 6,751,167 B2 | | 6/2004 | Yamada et al. | |
| 6,864,879 B2 | | 3/2005 | Nojima et al. | |
| 6,898,165 B2 | | 5/2005 | Kikuchi | |
| 7,072,249 B2 | | 7/2006 | Huang | |
| 7,277,362 B2 | | 10/2007 | Inoue et al. | |
| 7,401,345 B2 | | 7/2008 | Liu | |
| 8,053,660 B2 | | 11/2011 | Flum et al. | |
| 8,110,734 B2 | | 2/2012 | Flum | |
| 2003/0029305 A1 | | 2/2003 | Kent et al. | |
| 2008/0062560 A1 | | 3/2008 | Mazur et al. | |
| 2008/0144478 A1 | * | 6/2008 | Frederick | G11B 3/64 369/264 |

FOREIGN PATENT DOCUMENTS

| | | | | | |
|---|---|---|---|---|---|
| GB | 242474 A | * | 11/1925 | | G11B 17/02 |
| GB | 299253 A | * | 10/1928 | | G11B 19/00 |
| GB | 328737 A | * | 5/1930 | | G11B 19/00 |
| GB | 1310408 A | * | 3/1973 | | A63B 22/0605 |

\* cited by examiner

*Primary Examiner* — William J Klimowicz
(74) *Attorney, Agent, or Firm* — Carter, DeLuca & Farrell LLP; George Likourezos (57) ABSTRACT

A musical instrument configured to generate a scratching sound effect includes a rotatable platform configured to support a record thereon, and a pedal (such as, for example, a foot pedal) operably coupled to the platform. The foot pedal is actuatable from a first position to a second position to rotate the platform, and in turn, the record.

20 Claims, 11 Drawing Sheets

FOOT-ACTUATED MUSICAL TURNTABLE SYSTEM FOR GENERATING SOUNDS

TECHNICAL FIELD

The present disclosure generally relates to musical turntables, and more particularly to musical turntable systems that generate a "scratching" sound effect.

BACKGROUND

In the music industry, manipulating a record on a turntable produces a desirable sound effect known as "scratching." More specifically, the "scratching" sound is created by rocking a record back and forth relative to a record needle. Typically, disc jockeys, music producers, and other musical artists will need a pair of direct-drive turntables, a mixer, and a collection of vinyl records to produce the "scratching" sound effect. Further, current record turntables may only be manipulated by using one's hand.

SUMMARY

In one aspect, in accordance with the principles of the present disclosure, a musical turntable system for generating a sound effect is provided and includes a housing, a platform for supporting a record thereon, a tonearm coupled to the housing, and a pedal, such as, for example, a foot pedal. The platform is rotatably supported on the housing and the foot pedal is configured to be operably coupled to the platform, such that the platform rotates relative to the tonearm and the housing in response to an actuation of the foot pedal.

In aspects, the musical turntable system may further include a push-pull cable operably coupling the platform and the foot pedal. The push-pull cable may be configured to rotate the platform in response to the actuation of the foot pedal.

In aspects, the musical turntable system may further include an axle rotatably supported by the housing and non-rotatably coupled to the platform. The push-pull cable may be coupled to the axle and configured to rotate the axle about a longitudinal axis defined by the axle.

In aspects, the musical turntable system may further include an elongated bracket disposed within the housing and coupled to an end portion of the push-pull cable. The elongated bracket may be configured to rotate about the longitudinal axis of the axle between a first position and a second position.

In aspects, the axle may extend through the elongated bracket and may be configured to rotate the platform in response to the elongated bracket rotating from the first position to the second position.

In aspects, the musical turntable system may further include a clutch mechanism coupling the bracket to the axle, such that the bracket is configured to rotate the axle and the platform as the bracket rotates in a first direction, whereas the bracket may be configured to rotate relative to the axle and the platform as the bracket rotates in a second direction, opposite the first direction.

In aspects, the clutch mechanism may be a sprag clutch, a pawl and ratchet clutch, a roller clutch, or the like.

In aspects, the foot pedal may be configured to move from a first position to a second position in response to an application of an actuation force on the foot pedal. The foot pedal may be configured to automatically move from the second position to the first position upon an absence of the actuation force.

In aspects, the musical turntable system may further include a plate fixed about the axle and a lever movably coupled to the elongated bracket. The plate may be configured to rotate with the axle, and the lever may be configured to move relative to the elongated bracket between a first position and a second position. In the first position, the lever may be disengaged from the plate, and in the second position, the lever may be engaged with the plate to non-rotatably couple the elongated bracket and the axle.

In aspects, when the lever is in the first position, movement of the foot pedal from the second position to the first position may not result in rotation of the platform. When the lever is in the second position, movement of the foot pedal from the second position to the first position may drive a rotation of the platform.

In aspects, when the lever is in the first position, the axle and the platform may be configured to maintain a rotational orientation as the foot pedal moves from the second position to the first position. When the lever is in the second position, the axle and the platform may be configured to rotate in the second direction in response to the foot pedal moving from the second position to the first position.

In aspects, the elongated bracket may have a first end portion coupled to the end portion of the push-pull cable, and a second end portion. The lever may be rotatably supported on the second end portion of the elongated bracket.

In aspects, the elongated bracket may be resiliently biased toward the first position.

In aspects, the musical turntable system may further include an audio jack supported on the housing and configured to transfer audio signals to an amplifier.

In aspects, the musical turntable system may further include a phonograph disc record configured to be non-rotatably supported on the platform such that the phonograph disc record rotates relative to the tonearm with a rotation of the platform. The phonograph disc record and the tonearm may together be configured to generate a scratching sound in response to the rotation of the phonograph disc record by the platform.

In aspects, the platform may be configured to rotate in a first direction from a first rotational orientation to a second rotational orientation in response to movement of the foot pedal from a first position to a second position.

In aspects, the musical turntable system may further include a switch configured to transition the musical turntable system between a first mode of operation and a second mode of operation. In the first mode of operation, the platform may be configured to remain in the second rotational orientation as the foot pedal moves from the second position to the first position. In the second mode of operation, the platform may be configured to rotate in a second direction from the second rotational orientation toward the first rotational orientation as the foot pedal moves from the second position to the first position.

In accordance with another aspect of the present disclosure, a musical turntable system configured to generate a scratching sound effect is provided and includes a rotatable platform configured to support a record, an axle extending centrally through the rotatable platform and being non-rotatable relative to the rotatable platform, a pedal movable from a first, unactuated position to a second, actuated position, and a push-pull cable operably coupling the axle and the pedal. The platform is configured to rotate about a longitudinal axis defined by the axle in response to the pedal moving from the first position to the second position.

In aspects, the platform may be configured to rotate in a first direction from a first rotational orientation to a second rotational orientation in response to movement of the pedal from the first position to the second position.

In aspects, the musical turntable system may further include a switch configured to transition the musical turntable system between a first mode of operation and a second mode of operation. In the first mode of operation, the platform may be configured to remain in the second rotational orientation as the pedal moves from the second position to the first position. In the second mode of operation, the platform may be configured to rotate in a second direction from the second rotational orientation toward the first rotational orientation as the pedal moves from the second position to the first position.

As used herein, the terms parallel and perpendicular are understood to include relative configurations that are substantially parallel and substantially perpendicular up to about + or −20 degrees from true parallel and true perpendicular.

BRIEF DESCRIPTION OF THE DRAWINGS

The present disclosure will become more readily apparent from the specific description accompanied by the following drawings, in which.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The present disclosure generally provides a musical instrument, such as, for example, a musical turntable system including a record player platform that is rotated by a pedal (e.g., a foot pedal) and which produces a scratching sound when a record is rotated in one or both directions. In aspects, the musical turntable system may be operated in either of two modes; a single action or a double action. In the double action mode, when the pedal is depressed, the platform rotates (e.g., approximately 30 degrees) in one direction producing a musical scratching sound. When the pedal is released, the platform rotates in the opposite direction returning to the starting position, whereby the musical scratching sound is produced a second time. In the single action mode, a clutch mechanism only permits rotation of the platform when the pedal is depressed, such that when the pedal is released, the clutch mechanism prevents rotation of the platform as the pedal returns to the starting position.

The pedal may be connected to a cable, which connects to an actuator that is connected to an axle. The axle extends through a center point of the platform and is rotationally fixed relative to the platform. The cable, in response to an actuation of the pedal, pulls on the actuator causing the platform to rotate in one direction. A spring may be provided that returns the actuator to the starting position when the pedal is released. A clutch may be either engaged or disengaged by the user depending on which mode of operation is desired (i.e., single action or double action).

Another variation of the disclosed musical turntable system uses an electrical solenoid plunger to move the actuator. The pedal may include an electrical switch, which allows current to flow to the solenoid when the pedal is depressed. When released, a spring connected to the actuator returns the platform and the solenoid plunger to the starting position (e.g., an extended or retracted position).

Figure 1:
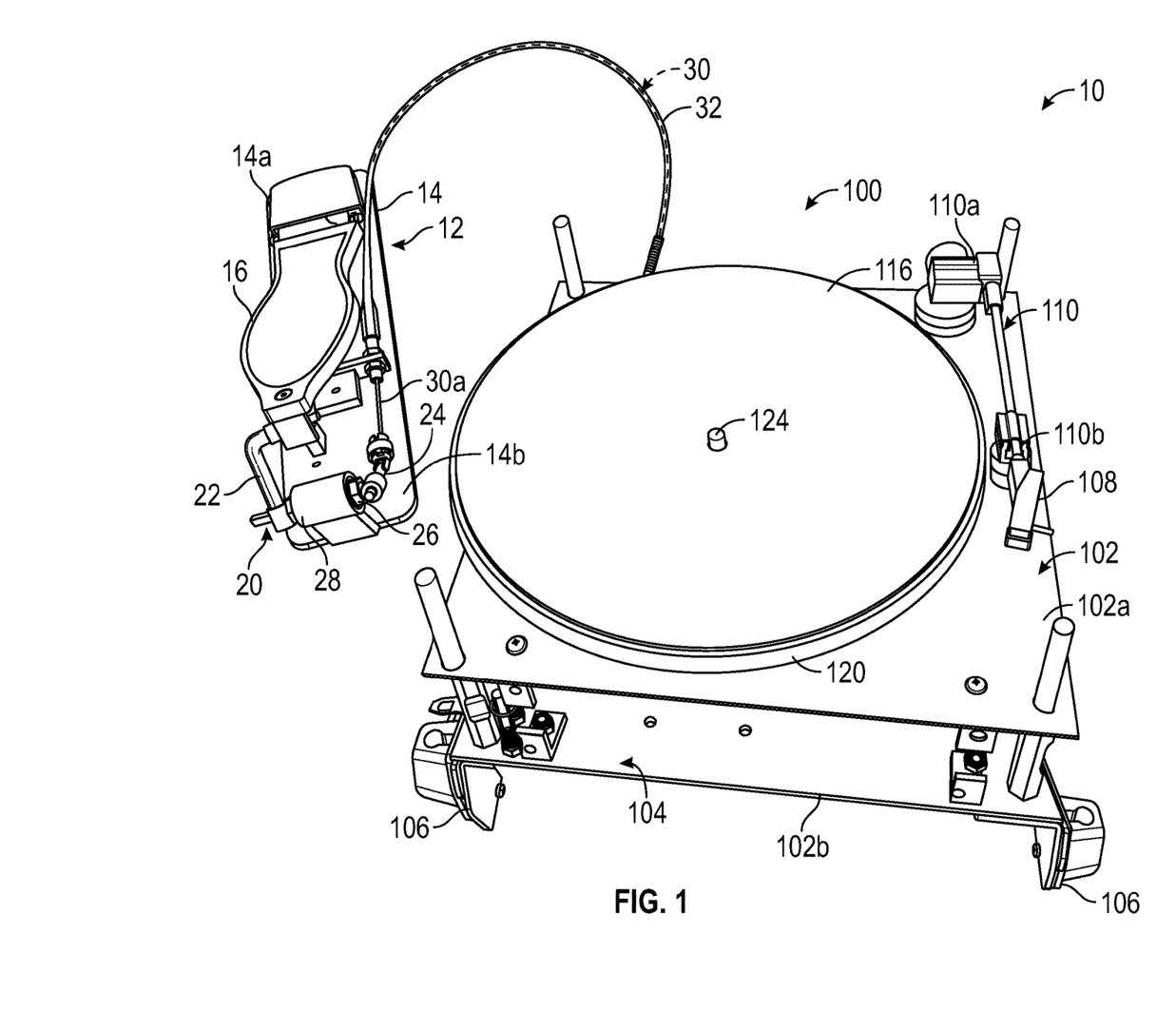
FIG. 1 is a top, perspective view illustrating an exemplary embodiment of a musical turntable system including a turntable assembly and a foot pedal assembly.
Figure 2:
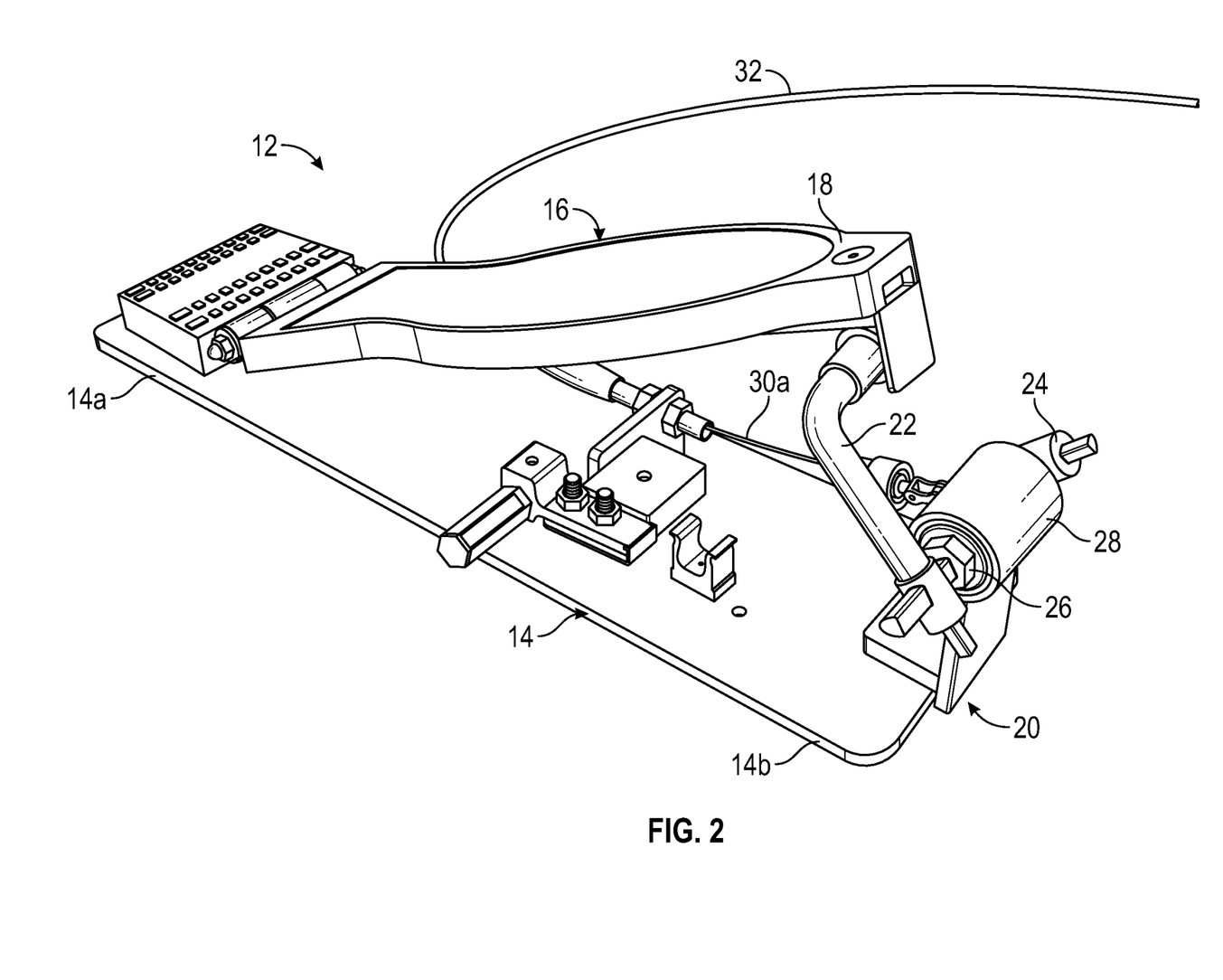
FIG. 2 is a side, perspective view illustrating the foot pedal assembly of FIG. 1.

With reference to FIGS. 1-2, an exemplary musical turntable system 10 for generating a scratching sound effect is illustrated. In aspects, the musical turntable system 10 may be configured to generate various sound effects other than a scratching sound effect. The musical turntable system 10 generally includes a pedal assembly 12 and a turntable assembly 100 mechanically coupled to the pedal assembly 12. The pedal assembly 12 includes a base 14, a foot pedal 16 pivotably coupled to a first end 14a of the base 14, and an actuation mechanism 20 supported on a second end 14b of the base 14. The actuation mechanism 20 has a first lever arm 22 on which a top end portion 18 of the foot pedal 16 is supported, a second lever arm 24, and a shaft 26 extending transversely between the first and second lever arms 22, 24. The shaft is rotationally supported in a barrel housing 28. A biasing member (e.g., a leaf spring) may be disposed in the barrel housing 28 that resiliently biases the foot pedal 16 toward a first, unactuated position.

In response to a downward-oriented force exerted by a user (e.g., by a user's foot) on the top end portion 18 of the foot pedal 16, the foot pedal 16 is configured to pivot from the first, unactuated position (FIG. 2), to a second, actuated position (FIG. 7A), to ultimately rotate the second lever arm 24 of the actuation mechanism 20. It is contemplated that a user may exert an actuating force on the foot pedal 16 with any suitable body part, such as a hand, an elbow, a knee, etc.

The musical turntable system 10 further includes a push-pull cable 30 having a first end portion 30*a* fixed to the second lever arm 24 of the actuation assembly 20 of the pedal assembly 12, and a second end portion 30*b* (FIG. 6B) coupled to the turntable assembly 100. The cable 30 may be enshrouded with a cover 32 that permits the cable 30 to travel longitudinally therethrough in response to a push-pull force derived from an actuation of the foot pedal 16. The cover 32 may have a male mating connector 35 (FIG. 6B) configured to detachably engage a female mating connector 37 fixed to the housing 102 to permit the cable 30 to translate relative to the cover 32.

Figure 3:
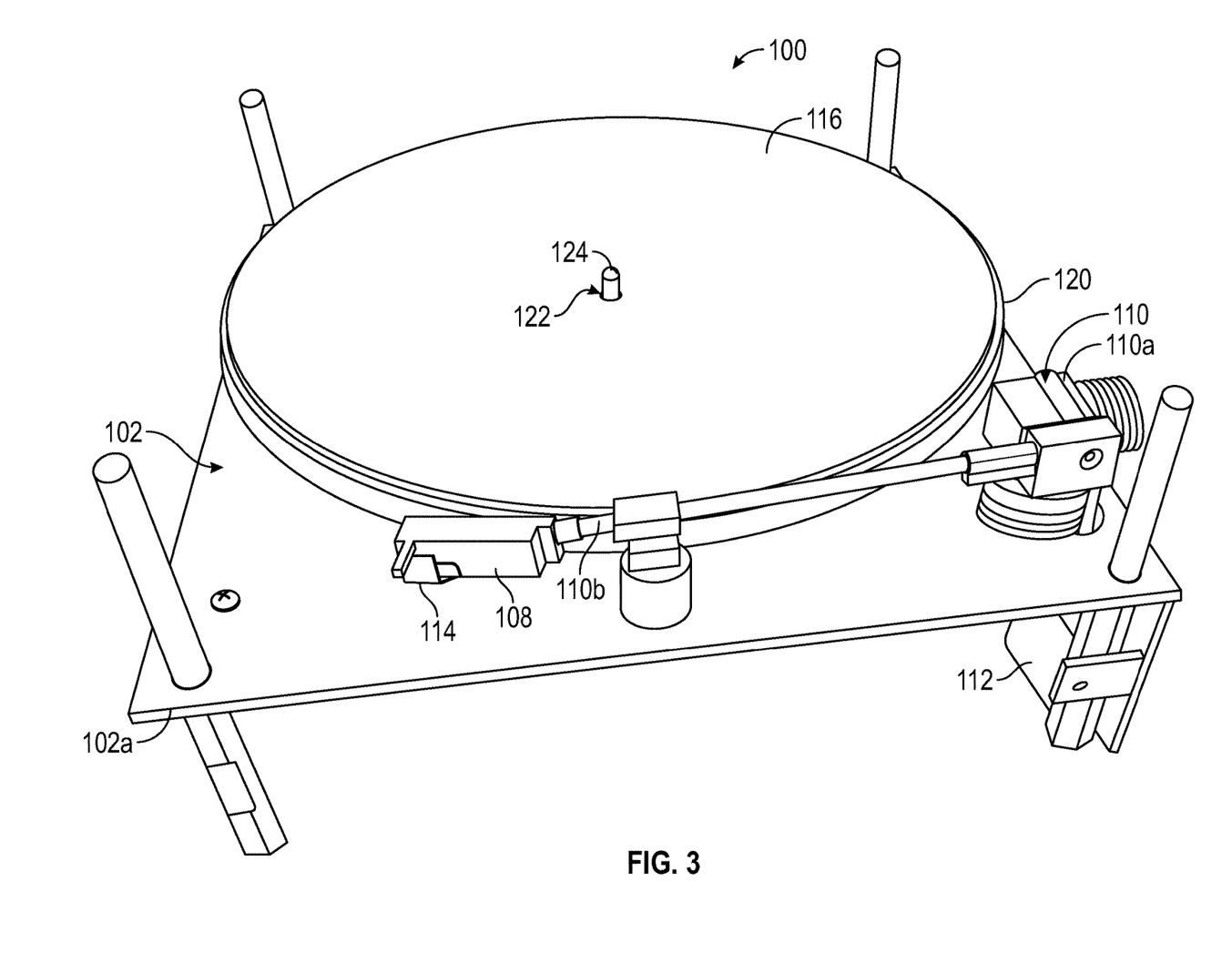
FIG. 3 is a top, perspective view illustrating the turntable assembly of FIG. 1.

With reference to FIGS. 1 and 3, the turntable assembly 100 of the musical turntable system 10 generally includes a housing 102, a tonearm 110 coupled to the housing 102, a circular platform 120 rotatably supported on the housing 102, and a drive assembly 140 (FIGS. 4 and 5) supported in the housing 102 and configured to convert the depression of the foot pedal 16 into a rotational motion of the platform 120. The housing 102 has an upper plate 102*a* and a lower plate 102*b* and defines an internal cavity 104 therebetween. In aspects, the housing 102 may have side walls that surround the outer periphery of the housing 102 to enclose the cavity 104 and the drive assembly 140. The housing 102 may be supported on a plurality of caster wheels 106 to facilitate movement of the turntable assembly 100 along a surface. In aspects, the housing 102 may be supported on or otherwise formed with a support structure or stand.

The tonearm 110 has a first end portion 110*a* rotationally coupled to the upper plate 102*a* of the housing 102, and a second end portion 110*b* that supports a cartridge 108, such as, for example, an electromechanical transducer. The cartridge 108 may be in electrical communication with an audio jack 112 that is configured to transfer audio signals from the tonearm 110 to an amplifier, a recording device, or the like. The cartridge 108 supports a stylus 114 or needle that extends downwardly therefrom. When the stylus 114 is engaged with a phonographic disc record 116, and the phonographic disc record 116 is rotated by the platform 120 relative to the stylus 114, a scratching sound effect is produced that is then transferred, via electrical wires, through the tonearm 110, to the audio jack 112, and to an amplifier. In aspects, the stylus 114 may be fabricated from diamond, sapphire, metal, plastic, or any other suitable material.

The platform 120 supports the phonograph record disc 116 thereon and is configured to frictionally engage the phonograph record disc 116 to transfer rotational motion thereto. In aspects, a friction-enhancing insert, such as, for example, a rubber disc, may be provided between the platform 120 and the phonograph record disc 116 to enhance the frictional engagement between the platform 120 and the phonograph record disc 116 to ensure that there is no relative rotation between the rotating platform 120 and the phonograph record disc 116. While the platform 120 is illustrated as being circular, it is contemplated that the platform 120 may assume any suitable shape, such as a square, a triangle, or the like.

The platform 120 is supported on the upper plate 102*a* of the housing 102 and defines a central opening 122 having an axle 124 extending therethrough. The axle 124 is supported by the housing 102 and is rotationally fixed to the platform 120 such that the platform 120 rotates with a rotation of the axle 124. It is contemplated that the axle 124 may have a non-circular transverse cross-section and the central opening 122 of the platform 120 may have a corresponding shape to form a non-rotatable connection therebetween. In other aspects, the axle 124 and the platform 120 may be fixed to one another via any suitable fastening engagement, such as an adhesive, a fastener, or the like.

Figure 4:
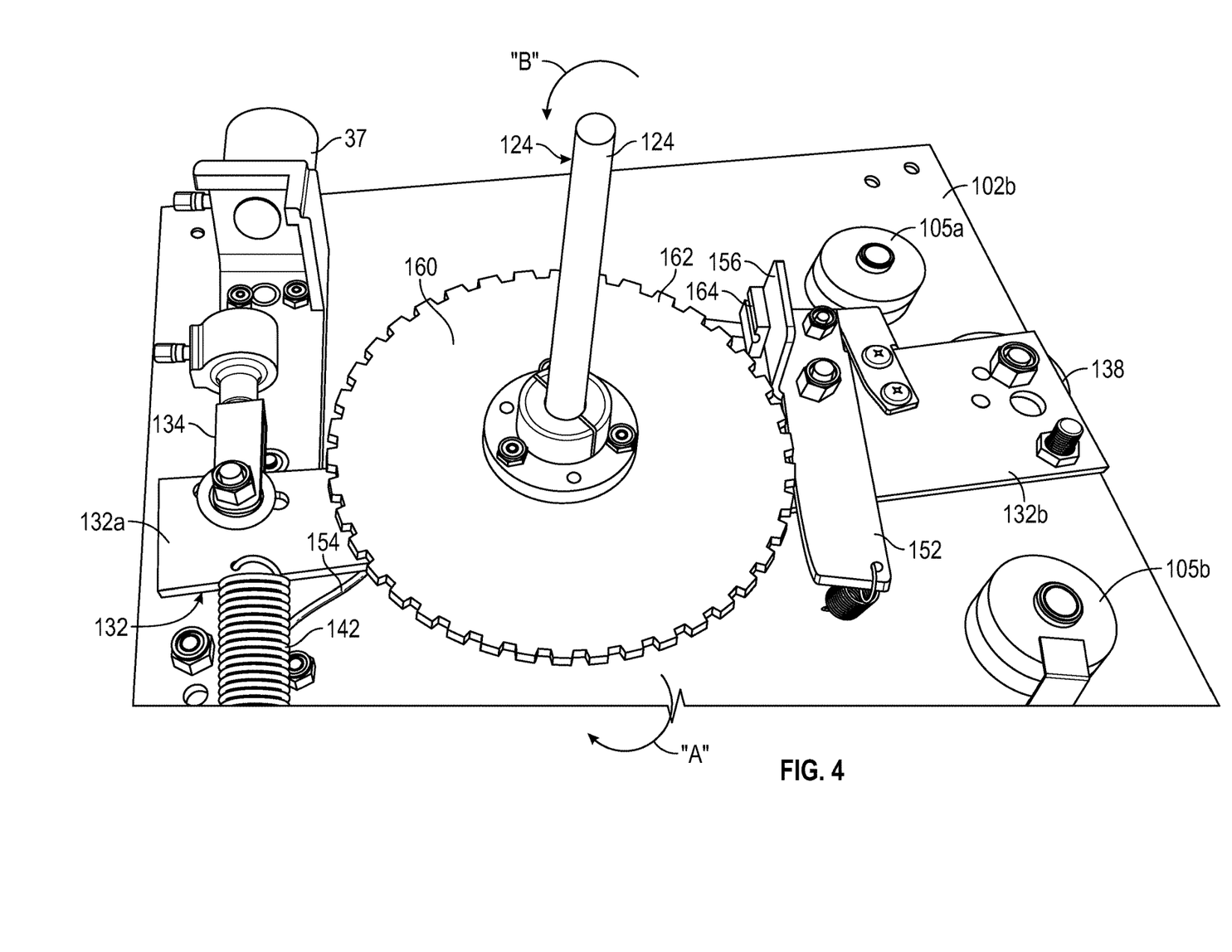
FIG. 4 is a top, perspective view, with parts removed, illustrating components of a drive mechanism of the turntable assembly of FIG. 1.
Figure 5:
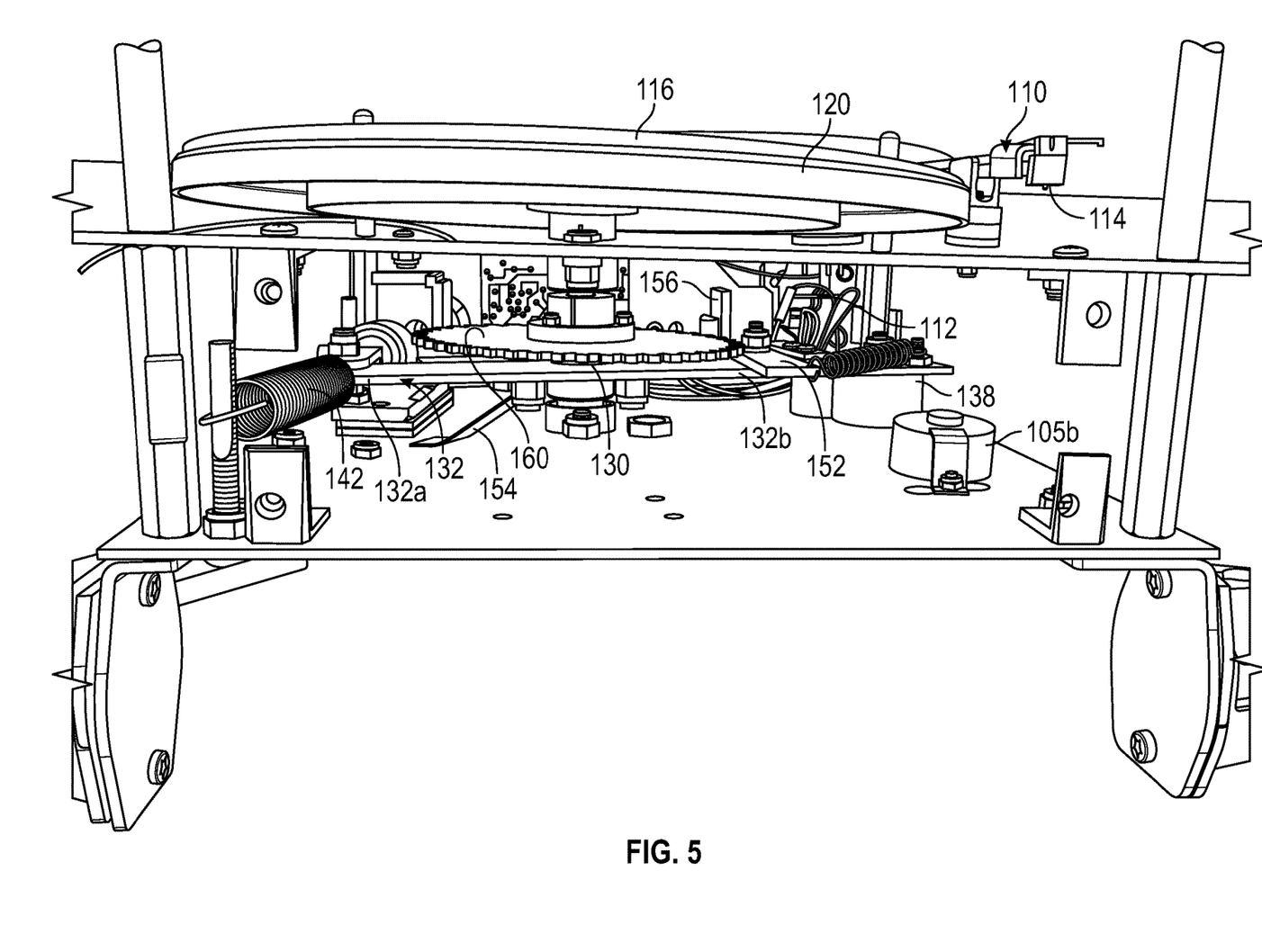
FIG. 5 is a front view, with parts removed, illustrating the drive mechanism of FIG. 4.

With reference to FIGS. 4 and 5, the drive assembly 140 (FIG. 6B) of the turntable assembly 100 includes an actuator, such as, for example, an elongated bracket 132 disposed within the housing 102, a short joint 134 coupled to the elongated bracket 132, and the cable 30. The short joint 134 is fixed to the second end portion 30*b* (FIG. 6B) of the cable 30 and is pivotably attached to a first end portion 132*a* of the elongated bracket 132 to transfer the push-pull motion of the cable 30 to the elongated bracket 132. The elongated bracket 132 is supported on the axle 124 and is rotatable by the axle 124 about a longitudinal axis of the axle 124. The elongated bracket 132 may have a stop 138 fixed to a bottom surface thereof. The stop 138 is disposed between a pair of spaced-apart stops 105*a*, 105*b* fixed to the lower plate 102*b* of the housing 102 that provide outer rotational limits of the elongated bracket 132.

The elongated bracket 132 may be coupled to the short joint 134 via a clutch mechanism 130 (FIG. 5) configured to permit rotation of the axle 124 (and the platform 120) by the elongated bracket 132 in a first direction "A" (FIG. 4), and resist rotation of the axle 124 (and the platform 120) by the elongated bracket 132 in a second direction "B," opposite the first direction. The clutch mechanism 130 may be a sprag clutch having an outer race (not explicitly shown) fixed to the elongated bracket 132 and an inner race (not explicitly shown) fixed about the axle 124 and rotatable by the outer race in the first direction "A" and non-rotatable in the second direction "B." In aspects, the clutch mechanism 130 may be a pawl and ratchet clutch, a roller clutch, or any other suitable ratchet or clutch device that permits rotation of the axle 124 relative to and by the elongated bracket 132 in the first direction "A," but prohibits rotation of the axle 124 relative to the elongated bracket 132 in the second direction "B."

The elongated bracket 132 is resiliently biased toward the first position by a coil spring 142 that extends between the first end portion 132*a* of the elongated bracket 132 and the lower plate 102*b* of the housing 102. The coil spring 142 assists the foot pedal 16 and the elongated bracket 132 in returning to their unactuated states.

With reference to FIGS. 4, 6B, 7B, 8A, and 8B, the turntable assembly 100 further includes a switch 150 operably coupled to a lever arm 152 that is supported on the second end portion 132*b* of the elongated bracket 132. As will be described, the switch 150 is configured to transition the musical turntable system 10 between a first mode of operation and a second mode of operation. The switch 150 may be configured as a hand-actuated boom pivotably coupled to the lower plate 102*b* and easily accessible to a user. The switch 150 is mechanically coupled to the lever arm 152 via another push-pull cable 154 for transferring a pivoting motion of the switch 150 to a pivoting motion of the lever arm 152. The lever arm 152 is pivotably supported on the second end portion 132b of the elongated bracket 132 and has a an inner-facing surface 156 configured to engage a gear plate 160. The lever arm 152 may be resiliently biased toward a first position (FIG. 4), in which the inner-facing surface 156 thereof is spaced from the gear plate 160.

Figure 8A:
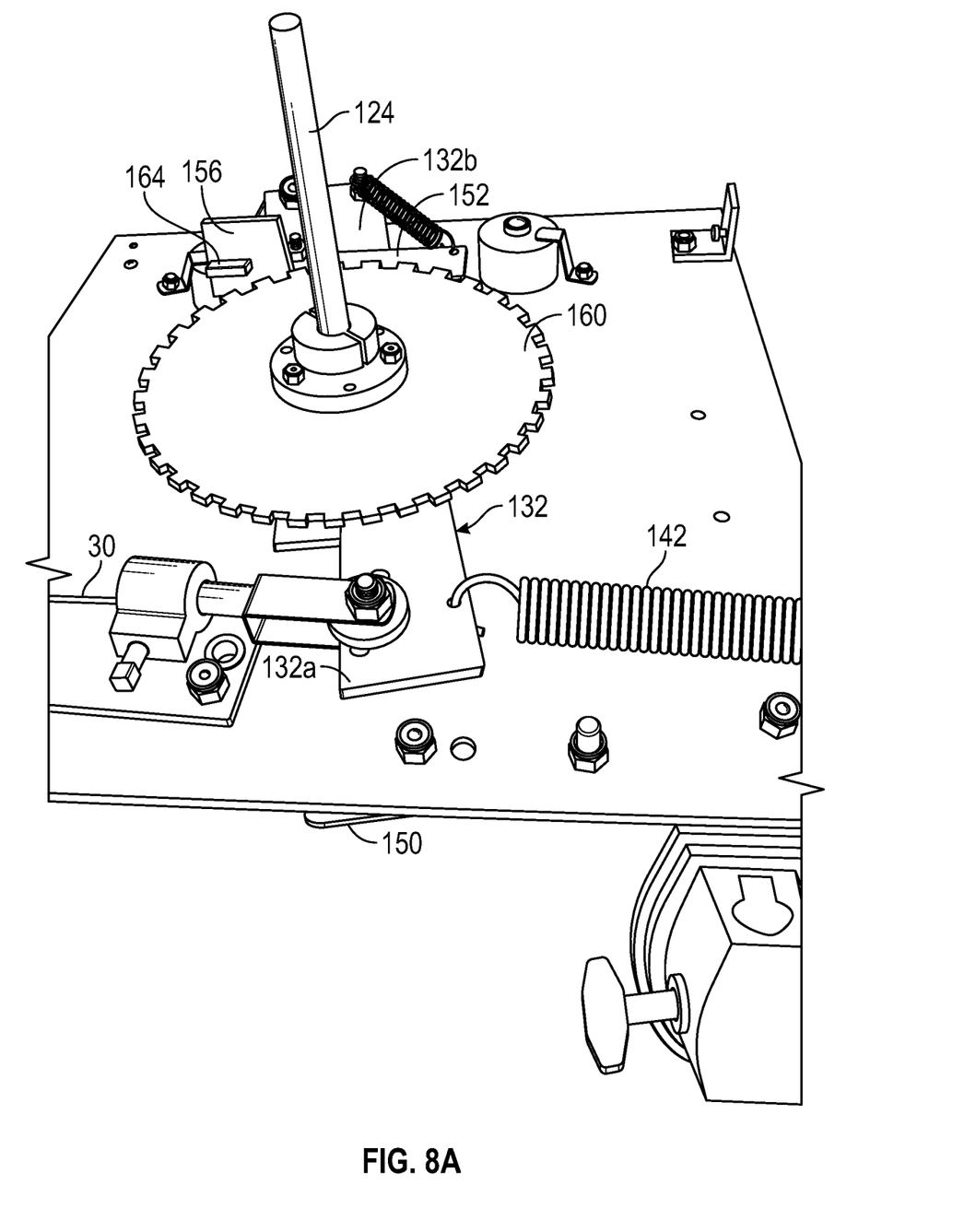
FIG. 8A is a side, perspective view, with parts removed, illustrating the musical turntable system in a first mode of operation.
Figure 8B:
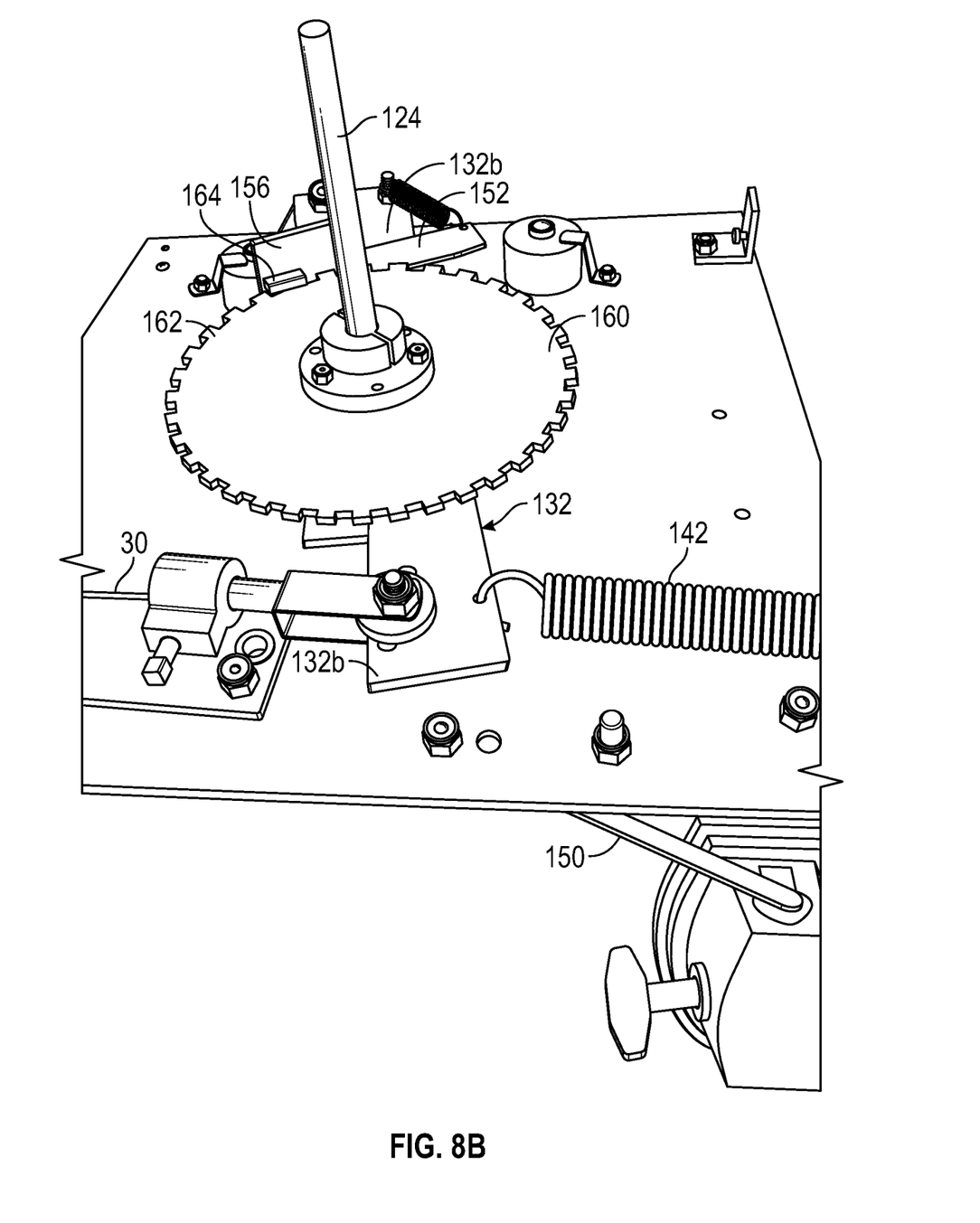
FIG. 8B is a side, perspective view, with parts removed, illustrating the musical turntable system in a second mode of operation.

The gear plate 160 is fixed about the axle 124 such that the gear plate 160 rotates with the axle 124 in both the first and second directions "A," "B." The gear plate 160 may have a plurality of gear teeth 162 disposed about the outer periphery thereof configured to selectively engage the inner-facing surface 156 of the lever arm 152 to prevent rotation of the gear plate 160 (and the axle 124) relative to the elongated bracket 132 when the lever arm 152 is in a second position (FIG. 8B). In aspects, the inner-facing surface 156 may have a tooth to engage a respective tooth 162 of the gear plate 160, or in other aspects, the inner-facing surface 156 may have a friction pad 164 that frictionally engages the outer surface of the gear plate 160.

The lever arm 152 is configured to pivot relative to the elongated bracket 132, in response to a manual actuation of the switch 150, between a first position (FIG. 8A), in which the lever arm 152 is disengaged from the gear plate 160, and a second position (FIG. 8B), in which the lever arm 152 is engaged with the gear plate 160. When the lever arm 152 is engaged with the gear plate 160, the gear plate 160 is non-rotatably coupled to the elongated bracket 132 so that the axle 124 (and the platform 120) rotate in both the first and second directions "A," "B" with a corresponding rotation of the elongated bracket 132.

Figure 6A:
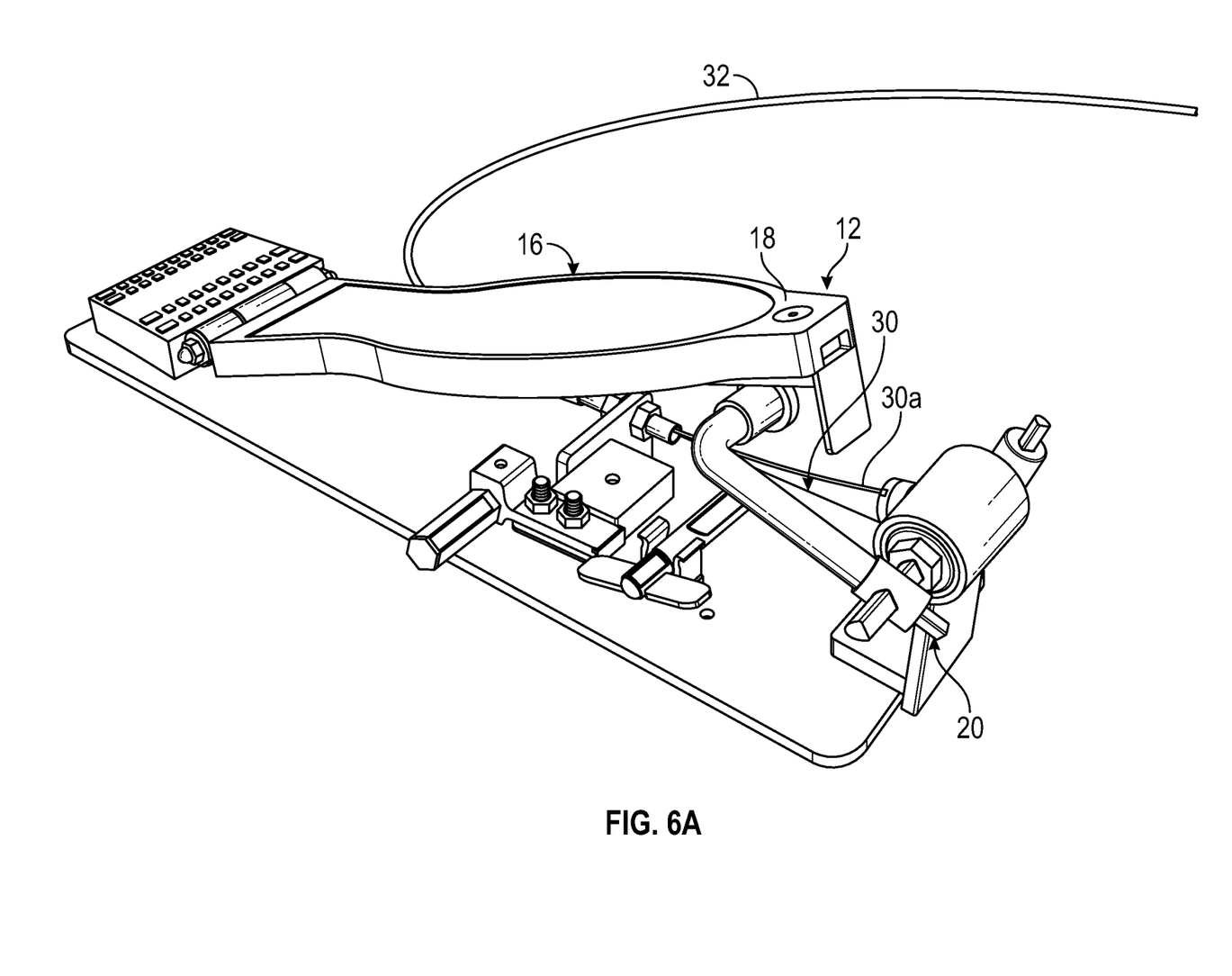
FIG. 6A is a perspective view illustrating the foot pedal assembly in a first, unactuated position.
Figure 7A:
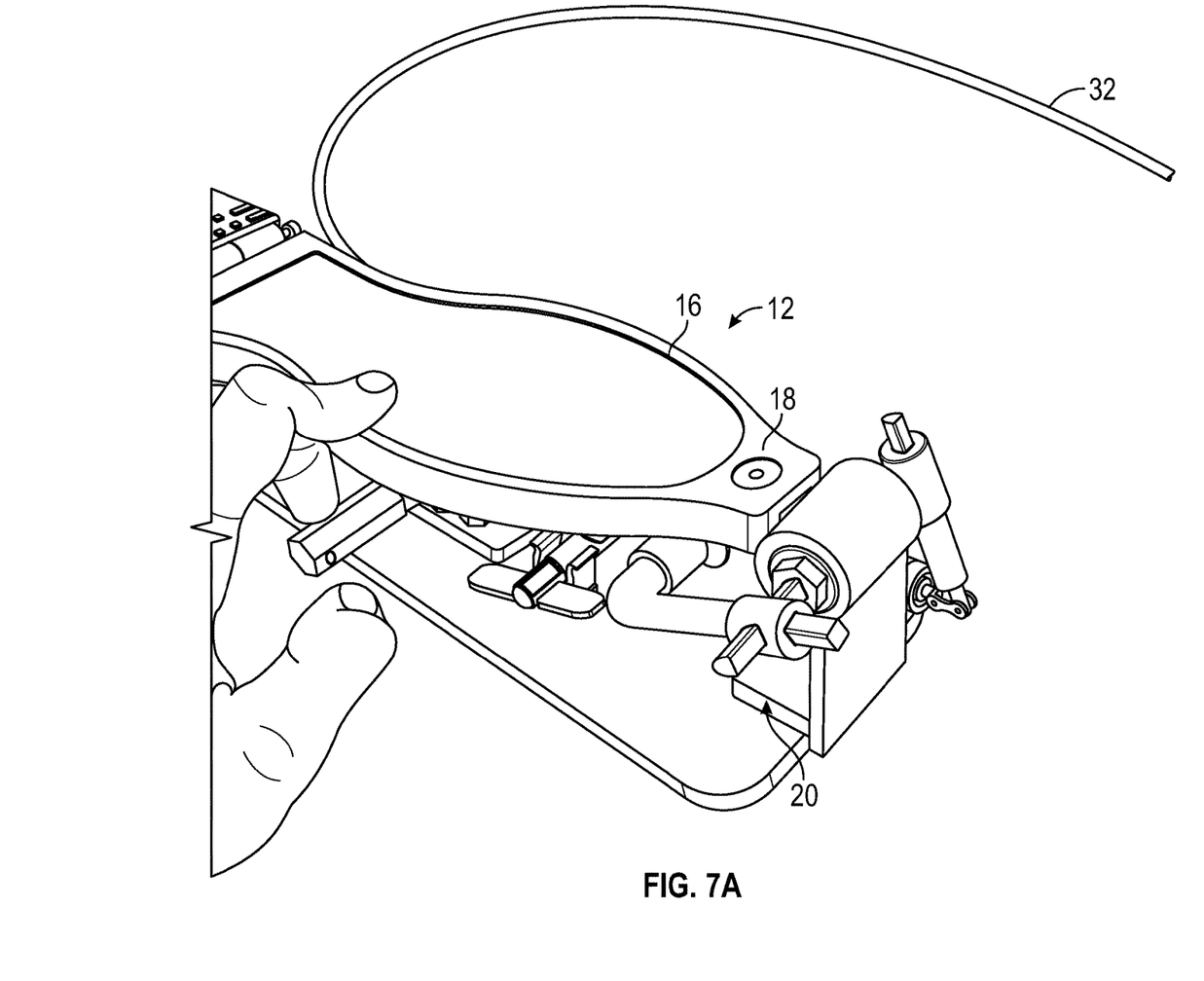
FIG. 7A is a perspective view illustrating the foot pedal assembly in a second, actuated position.

In operation, the phonograph record disc 116 or any other suitable disc is positioned on the platform 120, the audio jack 112 is connected to an amplifier (e.g., a speaker), and an electrical connector (not explicitly shown) of the musical turntable system 10 may be connected to a source of power (e.g., an AC outlet). With the musical turntable system 10 turned on, a user may then select between the two modes of operation depending on their preference. For example, with the musical turntable system 10 in the first mode of operation, to produce a scratching sound effect, the user may press down on the foot pedal 16 to rotate the foot pedal 16 from the first position, as shown in FIG. 6A, toward the second position, as shown in FIG. 7A. As the foot pedal 16 rotates toward the second position, the top end portion 18 of the foot pedal 16 rotates the actuation mechanism 20 of the pedal assembly 12 to retract or pull the push-pull cable 30.

Figure 6B:
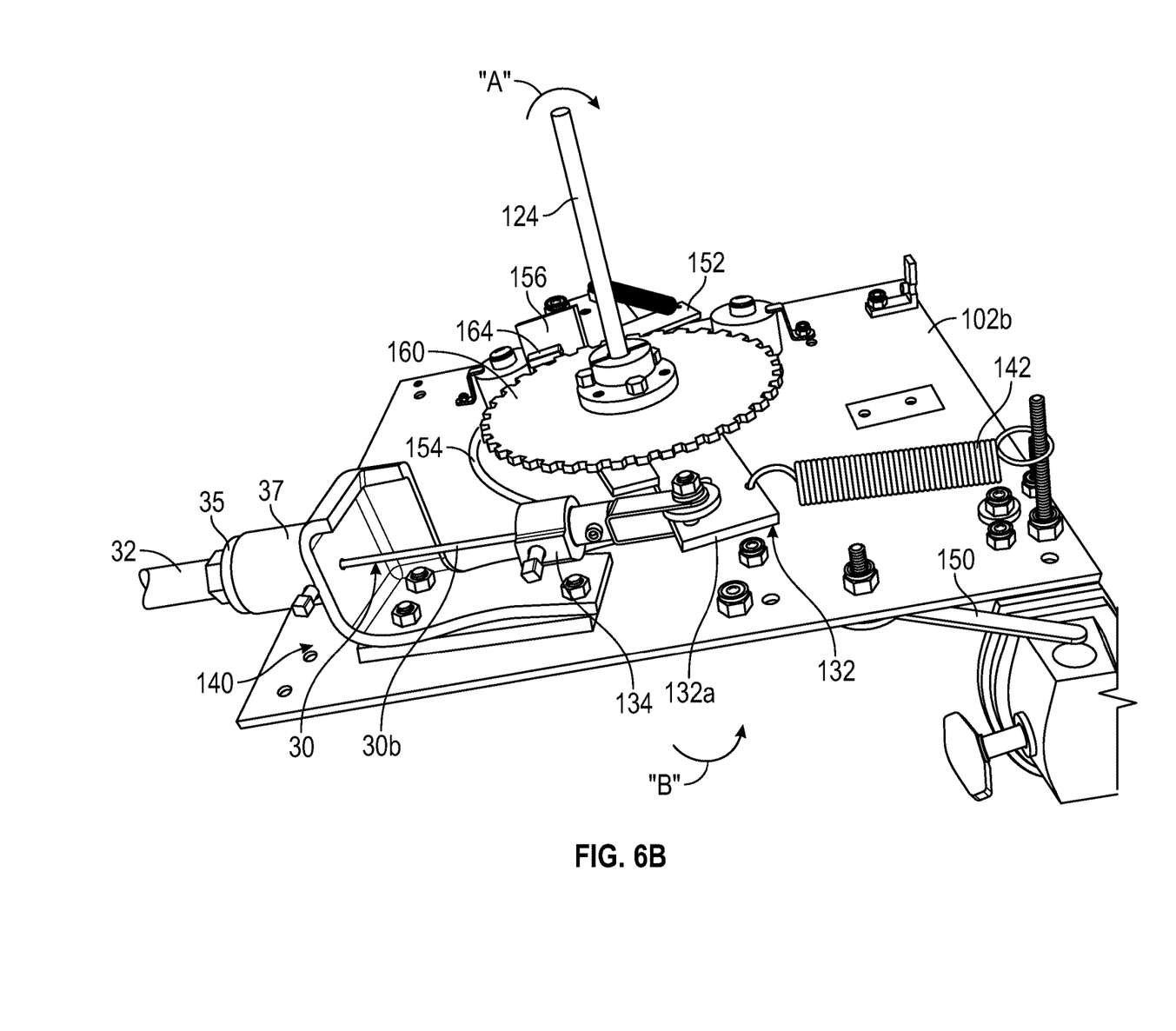
FIG. 6B is a side, perspective view, with parts removed, illustrating the drive mechanism in a first, unactuated state.
Figure 7B:
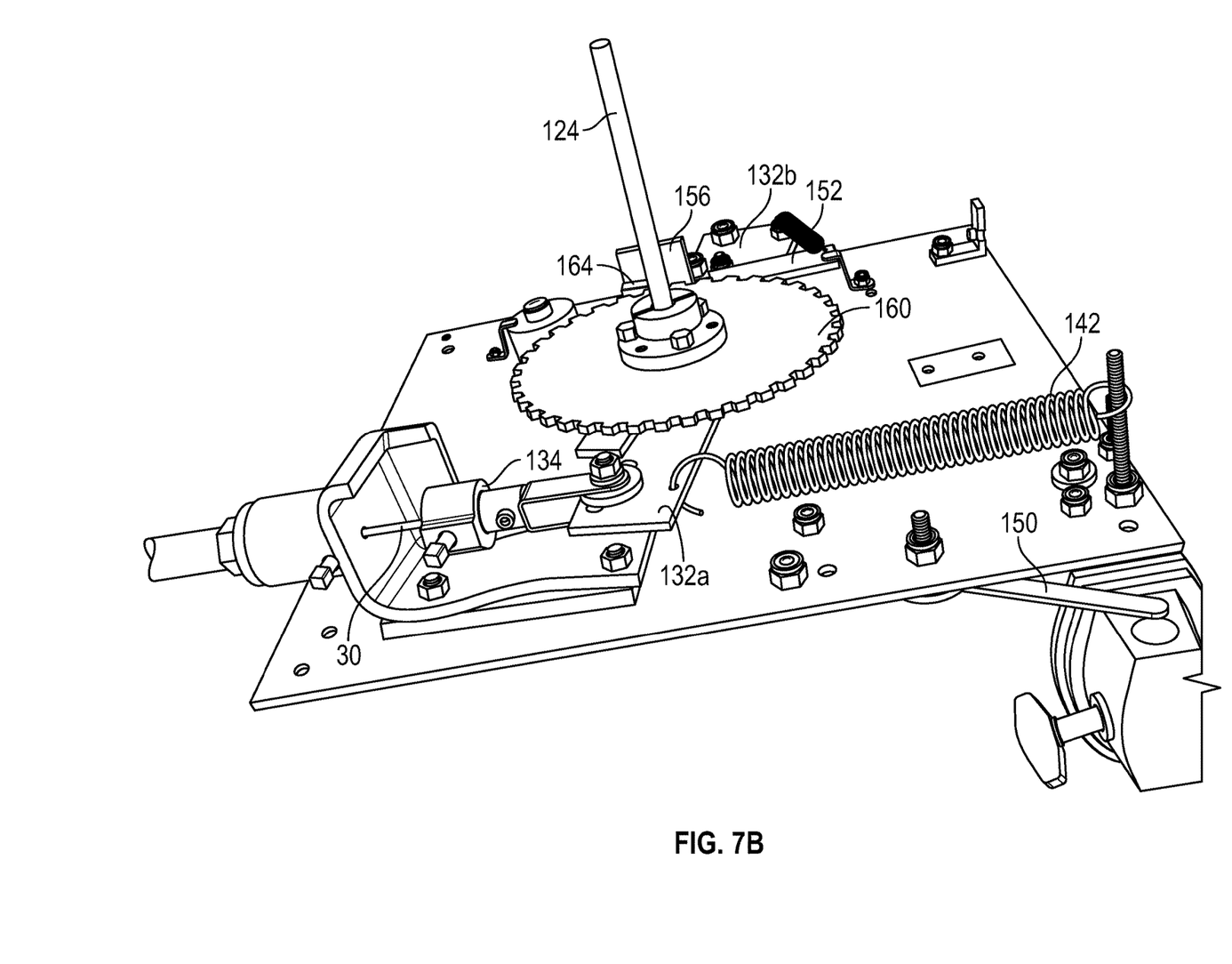
FIG. 7B is a side, perspective view, with parts removed, illustrating the drive mechanism in a second, actuated state.

As the push-pull cable 30 retracts, the push-pull cable 30 pulls on the elongated bracket 132 via the short joint 134 that pivotably couples the second end portion 30b of the cable 30 to the first end portion 132a of the elongated bracket 132. The retraction of the cable 30 rotates the elongated bracket 132 in the first direction "A" from a first position, as shown in FIG. 6B, to a second position, as shown in FIG. 7B. As the elongated bracket 132 rotates toward the second position, the coil spring 142 is extended, and therefore transitioned to a loaded state. Since the elongated bracket 132 is non-rotatably coupled to the axle 124 via the clutch mechanism 130, the rotation of the elongated bracket 132 in the first direction "A" drives a rotation of the axle 124 and the attached platform 120 in the first direction "A" from a first rotational orientation toward a second rotational orientation. The phonograph record disc 116 is rotated by the rotating platform 120 relative to the stylus 114 of the tonearm 110 to produce the scratching sound effect. The scratching sound effect may be amplified by a speaker in electrical communication with the tonearm 110 via the audio jack 112.

As the user releases their foot from the foot pedal 16, the foot pedal 16 is allowed to return to the first, unactuated state. As the foot pedal 16 is released, the loaded coil spring 142 releases its stored potential energy to drive a return rotation of the elongated bracket 132. As the elongated bracket 132 rotates from the second position (FIG. 7B) back to the first position (FIG. 6B), the elongated bracket 132 rotates relative to and about the axle 124 while the axle 124 maintains its rotational orientation due to the action of the clutch mechanism 130. In this way, as the foot pedal 16 moves from the second position back to the first position, the platform 120 (and the phonograph record disc 116) does not rotate. Accordingly, when the musical turntable system 10 is in the first mode of operation, the scratching sound effect is only produced as the foot pedal 16 moves from the first position to the second position.

If a user prefers the second mode of operation, the switch 150 may be manually rotated from a first position, as shown in FIG. 8A, to a second position, as shown in FIG. 8B, to transition the musical turntable system 10 from the first mode of operation to the second mode of operation. It is contemplated that the default mode of operation may alternatively be the second mode of operation. As the switch 150 is rotated relative to the housing 102, the second push-pull cable 154 (FIG. 6B) rotates the lever arm 152 relative to the elongated bracket 132 from the first position (FIG. 8A) to the second position (FIG. 8B), in which the inner-facing surface 156 of the lever arm 152 engages the gear plate 160 to non-rotatably couple the gear plate 160 and the elongated bracket 132.

With the musical turntable system 10 in the second mode of operation, to produce a scratching sound effect, the user may press down on the foot pedal 16 to rotate the foot pedal 16 from the first position, as shown in FIG. 6A, toward the second position, as shown in FIG. 7A. As the foot pedal 16 rotates toward the second position, the top end portion 18 of the foot pedal 16 rotates the actuation mechanism 20 of the pedal assembly 12 to retract or pull the push-pull cable 30. As described above, as the push-pull cable 30 retracts, the elongated bracket 132 is rotated in the first direction "A" from the first position, as shown in FIG. 6B, to the second position, as shown in FIG. 7B. As described above, since the elongated bracket 132 is non-rotatably coupled to the axle 124 via the clutch mechanism 130, the rotation of the elongated bracket 132 in the first direction "A" drives a rotation of the axle 124 and the attached platform 120 in the first direction. The phonograph record disc 116 is rotated by the rotating platform 120 relative to the stylus 114 of the tonearm 110 to produce a first scratching sound effect.

As the user releases their foot from the foot pedal 16, the foot pedal 16 is allowed to return to the first, unactuated state. As the foot pedal 16 is released, the loaded coil spring 142 releases its stored potential energy to drive a return rotation of the elongated bracket 132. Since the elongated bracket 132 is non-rotatably coupled to the axle 124 via the engagement between the lever arm 152 and the gear plate 160, as the elongated bracket 132 rotates from the second position back to the first position, the axle 124 (and the platform 120) rotates with the elongated bracket 132 to rotate the platform 120, in the second direction "B," from the second rotational orientation back to the first rotational orientation to produce a second scratching sound effect between the phonograph record disc 116 and the stylus 114 of the tonearm 110. In this way, two distinct scratching sound effects are produced from a single actuation of the foot pedal 16 when the musical turntable system 10 is in the second mode of operation.

In aspects, the axle 124 (and the platform 120) may be permanently non-rotatably coupled to the actuator 132.

Various alternative drive assemblies are contemplated for converting an actuation of the foot pedal 16 into a rotation of the platform 120, such as, for example, a belt drive system, an electrical system having an electric switch and a solenoid, a geared system, etc.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A musical turntable system for generating a sound effect, comprising:
    a housing;
    a platform for supporting a record thereon, the platform being rotatably supported on the housing;
    a tonearm coupled to the housing;
    a foot pedal configured to be operably coupled to the platform, such that the platform rotates relative to the tonearm and the housing in response to an actuation of the foot pedal; and
    a push-pull cable operably coupling the platform and the foot pedal, wherein the push-pull cable is configured to rotate the platform in response to the actuation of the foot pedal.

2. The musical turntable system according to claim 1, further comprising an axle rotatably supported by the housing and non-rotatably coupled to the platform, wherein the push-pull cable is coupled to the axle and configured to rotate the axle about a longitudinal axis defined by the axle.

3. The musical turntable system according to claim 2, further comprising an elongated bracket disposed within the housing and coupled to an end portion of the push-pull cable, wherein the elongated bracket is configured to rotate about the longitudinal axis of the axle between a first position and a second position.

4. The musical turntable system according to claim 3, wherein the axle extends through the elongated bracket and is configured to rotate the platform in response to the elongated bracket rotating from the first position to the second position.

5. The musical turntable system according to claim 4, further comprising a clutch mechanism coupling the bracket to the axle, such that the bracket is configured to rotate the axle and the platform as the bracket rotates in a first direction, and the bracket is configured to rotate relative to the axle and the platform as the bracket rotates in a second direction, opposite the first direction.

6. The musical turntable system according to claim 5, wherein the clutch mechanism is selected from the group consisting of a sprag clutch, a pawl and ratchet clutch, and a roller clutch.

7. The musical turntable system according to claim 5, wherein the foot pedal is configured to move from a first position to a second position in response to an application of an actuation force on the foot pedal, and is configured to automatically move from the second position to the first position upon an absence of the actuation force.

8. The musical turntable system according to claim 7, further comprising:
    a plate fixed about the axle and configured to rotate with the axle; and
    a lever movably coupled to the elongated bracket, wherein the lever is configured to move relative to the elongated bracket between a first position, in which the lever is disengaged from the plate, and a second position, in which the lever is engaged with the plate to non-rotatably couple the elongated bracket and the axle.

9. The musical turntable system according to claim 8, wherein when the lever is in the first position, movement of the foot pedal from the second position to the first position does not result in rotation of the platform, and when the lever is in the second position, movement of the foot pedal from the second position to the first position drives a rotation of the platform.

10. The musical turntable system according to claim 8, wherein when the lever is in the first position, the axle and the platform are configured to maintain a rotational orientation as the foot pedal moves from the second position to the first position, and when the lever is in the second position, the axle and the platform are configured to rotate in the second direction in response to the foot pedal moving from the second position to the first position.

11. The musical turntable system according to claim 8, wherein the elongated bracket has a first end portion coupled to the end portion of the push-pull cable, and a second end portion, the lever being rotatably supported on the second end portion of the elongated bracket.

12. The musical turntable system according to claim 3, wherein the elongated bracket is resiliently biased toward the first position.

13. The musical turntable system according to claim 1, further comprising an audio jack supported on the housing and configured to transfer audio signals to an amplifier.

14. The musical turntable system according to claim 1, further comprising a phonograph disc record configured to be non-rotatably supported on the platform such that the phonograph disc record rotates relative to the tonearm with a rotation of the platform, wherein the phonograph disc record and the tonearm are together configured to generate a scratching sound in response to the rotation of the phonograph disc record by the platform.

15. The musical turntable system according to claim 1, wherein the platform is configured to rotate in a first direction from a first rotational orientation to a second rotational orientation in response to movement of the foot pedal from a first position to a second position.

16. The musical turntable system according to claim 15, further comprising a switch configured to transition the musical turntable system between a first mode of operation, in which the platform is configured to remain in the second rotational orientation as the pedal moves from the second position to the first position, and a second mode of operation, in which the platform is configured to rotate in a second direction from the second rotational orientation toward the first rotational orientation as the pedal moves from the second position to the first position.

17. A musical turntable system configured to generate a scratching sound effect, comprising:
    a rotatable platform configured to support a record;
    an axle being non-rotatable relative to the rotatable platform;
    a pedal movable from a first, unactuated position to a second, actuated position;
    a drive assembly operably coupling the axle and the pedal, wherein the platform is configured to rotate about a longitudinal axis defined by the axle in response to the pedal moving from the first position to the second position, wherein the platform is configured to rotate in a first direction from a first rotational orientation to a second rotational orientation in response to movement of the pedal from the first position to the second position; and
    a switch configured to transition the musical turntable system between a first mode of operation, in which the platform is configured to remain in the second rotational orientation as the pedal moves from the second position to the first position, and a second mode of operation, in which the platform is configured to rotate in a second direction from the second rotational orientation toward the first rotational orientation as the pedal moves from the second position to the first position.

18. A musical turntable system for generating a sound effect, comprising:
a housing;
a platform for supporting a record thereon, the platform being rotatably supported on the housing;
a tonearm coupled to the housing; and
a pedal assembly configured to be operably coupled to the platform and including:
a base; and
a foot pedal pivotably coupled to the base at a proximal end of the foot pedal; an actuation mechanism configured to be operably coupled to the foot pedal at a distal end of the foot pedal, such that the platform rotates relative to the tonearm in response to a pivoting of the foot pedal relative to the base by a pivoting motion of a foot of a user.

19. A musical turntable system for generating a sound effect, comprising:
a housing;
a platform for supporting a record thereon, the platform being rotatably supported on the housing;
a tonearm coupled to the housing;
a foot pedal configured to be operably coupled to the platform; an actuation mechanism configured to be operably coupled to the foot pedal at a distal end of the foot pedal, such that the platform rotates relative to the tonearm in response to a movement of the foot pedal between a starting position and an actuated position; and
a biasing member coupled to the foot pedal, wherein the foot pedal is biased toward the starting position by the biasing member.

20. A musical turntable system for generating a sound effect, comprising:
a housing;
a platform for supporting a record thereon, the platform being rotatably supported on the housing;
a tonearm coupled to the housing; and
a pedal assembly configured to be operably coupled to the platform and including:
a base; and
a foot pedal coupled to the base; an actuation mechanism configured to be operably coupled to the foot pedal at a distal end of the foot pedal, such that the platform rotates relative to the tonearm in response to a movement of the foot pedal relative to the base from a starting position to an actuated position, wherein the pedal assembly is configured to resist movement of the foot pedal beyond the actuated position.

* * * * *